United States Patent [19]

Miller

[11] 3,912,857

[45] Oct. 14, 1975

[54] STYLUS ARM PIVOT

[75] Inventor: Michael Evans Miller, Indianapolis, Ind.

[73] Assignee: RCA Corporation, New York, N.Y.

[22] Filed: Aug. 31, 1973

[21] Appl. No.: 393,695

[30] Foreign Application Priority Data

Mar. 26, 1973 United Kingdom.............. 14394/73

[52] U.S. Cl............ 178/6.6 A; 274/23 R; 274/23 A

[51] Int. Cl........................................... G11b 3/38

[58] Field of Search.................. 272/37, 23 R, 23 A; 179/100.4 R; 178/6.6 A

[56] References Cited

UNITED STATES PATENTS

| | | | |
|---|---|---|---|
| 3,006,652 | 10/1961 | Mankovitz | 274/23 A |
| 3,556,537 | 1/1971 | Stacy | 274/23 R |
| 3,711,641 | 1/1973 | Palmer | 360/73 |
| 3,783,196 | 1/1974 | Stanley | 179/4 M |

*Primary Examiner*—Bernard Konick
*Assistant Examiner*—David K. Moore
*Attorney, Agent, or Firm*—Eugene M. Whitacre; Dilip A. Kulkarni

[57] ABSTRACT

A stylus arm pivot coupling comprises a plug having a tapered end with circular cross section, and a support member with a circular opening having dimensions permitting only a partial entry of, and presenting annular surfaces for smooth engagement with the tapered end of the plug. The plug is attached to the stylus arm and the support member is attached to a stylus arm carrying structure.

10 Claims, 6 Drawing Figures

STYLUS ARM PIVOT

BACKGROUND OF THE INVENTION

This invention pertains to a stylus arm pivot coupling compatible with the electronic and mechanical requirements of a video disc system.

In certain video disc systems, video information is recorded by means of geometric variations in the bottom of a smooth spiral groove on the surface of a disc. The disc surface includes a layer of conductive material which is preferably covered with a thin coating of dielectric material. A stylus engages the spiral groove and includes a conductive surface which, together with the conductive material and the dielectric coating of the disc, form a capacitor. When the disc is rotated, an edge of the conductive surface of the stylus, while riding in the disc groove, receovers capacitive variations due to the geometrical variations in the bottom of the spiral groove. The capacitive variations which represent recorded video information are processed and applied to a conventional television receiver for reproduction. The variable capacitor concept is described in detail in the copending U.S. Patent application, Ser. No. 126,772, filed Mar. 22, 1971, and now U.S. Pat. No. 3,842,194, for J. K. Clemens, entitled "Information Records and Recording/Playback Systems Therefor," also assigned to the present assignee.

The stylus including the conductive surface is attached to the free end of a stylus arm. The stylus arm is freely pivoted at its other end on a support member attached to a stylus arm carrying structure. The stylus arm carrying structure desirably incorporates suitable feed drive mechanism for driving the stylus arm assembly transversely across the disc in proper time relationship with the rotational speed of the disc whereby the attitude of the stylus conductive surface in the groove may be held relatively constant.

In video disc systems of the aforementioned Clemens' type (U.S. Patent application, Ser. No. 126,772) it is desirable to maintain the relative motion between the disc and the stylus at a predetermined speed (e.g. 450 rpm) to obtain accurate reproduction of the recorded information. Although precise mechanical design and manufacture of the disc and playback apparatus minimize the speed errors, random cyclical errors sufficient to noticeably affect the picture quality (e.g., by causing jitter) will remain. Cyclical speed errors result from several sources. For example, disc and turntable eccentricities, and disc manufacturing defects, to name a few. Errors caused by the aforementioned sources appear at the stylus once every revolution. By way of example, speed errors caused by the disc mounting eccentricity will occur at a frequency of 7.5 Hz (at disc rotational speed of 450 rpm). Speed errors caused by two disc manufacturing defects per groove (e.g. two scratches) will repeat at a frequency of 15 Hz (at disc rotational speed of 450 rpm), and so on. In U.S. Pat. No. 3,711,641, issued to R. C. Palmer on Jan. 16, 1973, entitled "Velocity Adjusting System," a system is disclosed for compensating cyclical speed errors by varying the position of the stylus in the groove primarily along the longitudinal axis of the stylus arm. This is accomplished by providing a support member for the stylus arm pivot, which is rendered subject to a correcting motion in response to cyclical speed errors. For satisfactory operation of the velocity adjusting system of the above type, the motion imparted to the support member of the stylus arm pivot assembly must be transmitted to the stylus at the error frequencies. Therefore, it is desirable that the coupling between the stylus arm carrying stylus, and the support member be relatively stiff in a direction along the longitudinal axis of the stylus arm.

The cyclical motion imparted to the stylus arm pivot by the velocity adjusting system results in wear and tear of the mating pivotal surfaces, thereby injecting a backlash component in the transmitted motion. Therefore, it is desirable that the pivot coupling be self-adjusting to compensate for the wear and tear of the mating surfaces.

In video disc systems adequate bandwidth for monochrome and color display is obtained by rotating the disc at a speed substantially higher (e.g. 450 rpm) than conventional audio playback speeds (e.g. 33 ⅓ rpm). For a given number of imperfections per groove, the higher the speed of rotation, the higher would be the frequency of disturbances with which the stylus arm assembly must cope with for accurate tracking. These disturbances are mainly in the two directions perpendicular to the longitudinal axis of the stylus arm. The relatively high speeds employed in video disc systems make a sensitive stylus arm assembly desirable.

Playing time of a disc is a function of groove density (grooves per inch) and the rotational speed of the disc. For a given rotational speed of the disc, higher playing time can be obtained by packing more grooves per inch. Use of a high groove density results in narrow grooves. The tendency of the stylus arm assembly to skip and skate across the grooves on the disc increases with narrowness of the grooves. For a given width of the grooves the tendency of the stylus arm assembly to skip and skate can be decreased by reducing the torsional resistance offered by the pivot. A high rotational speed and a high groove density used in video disc systems make a low torsional resistance pivot desirable.

It is desirable in order to facilitate inspection or replacement of the stylus, that the stylus arm pivot arrangement permit substantially instantaneous removal of the stylus arm from the stylus arm carrying structure without requirements for complicated manual disconnecting of the components. It is also desirable that the arrangement permit easy drop-in re-engagement into proper operative position by an untrained user in the manner that minimizes the likelihood of a misalignment which could degrade the performance of the playback system.

It is advantageous to provide a stylus arm pivot assembly which permits standardization and modular construction compatible with low cost mass production processes.

Prior art stylus arm pivot arrangements fall short of the requirements set forth above. In accordance with the present invention, a very low mass stylus arm assembly is provided which is compliant in the two directions perpendicular to the longitudinal axis of the stylus arm and stiff along the longitudinal axis of the stylus arm. A plug having a tapered end with circular cross section is attached to the pivoted end of a stylus arm. The plug is received in a support member with a circular opening having dimensions permitting only a partial entry of the plug and presenting coordinating annular surfaces for smooth engagement with the plug. The support member is attached to the stylus arm carrying structure which is linked to the motorboard of a video disc system. The stylus arm carries at its free end a stylus which is subject to positioning in a spiral groove provided on a disc. The disc is carried on a turntable rotatably mounted relative to the motorboard. Video information is contained in geometric variations in the bottom of the spiral groove. The information detected by the stylus is processed and transmitted to a conventional television receiver for reproduction. The tipping of the stylus arm around an imaginary axis formed by a straight line joining the center of the opening in the support member and the stylus tip, is prevented by two parallel surfaces separated by a distance slightly greater than dimension of the plug and in sliding engagement with the plug.

The objects and advantages of the present invention will be recognized by those skilled in the art upon a reading of the following detailed description and an inspection of the accompanying drawings in which.

DESCRIPTION OF THE INVENTION

Figure 1:
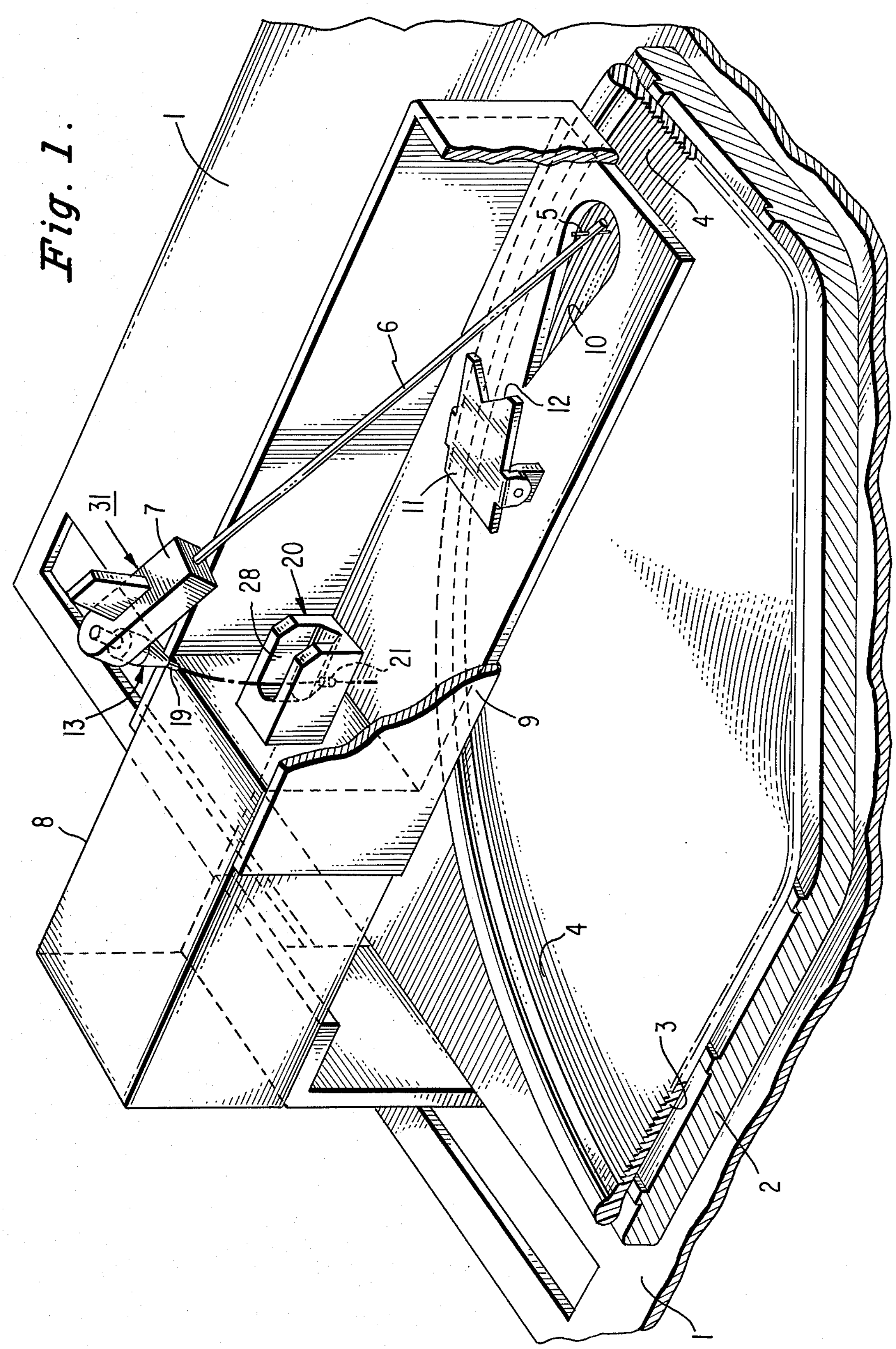
FIG. 1 is a partial perspective view of a video disc system illustrating the stylus arm assembly disengaged from its carrying structure.

FIG. 1 illustrates a portion of an assembly comprising a motorboard 1 having a turntable 2 rotatably mounted thereon. The assembly is suitable for use in a video disc system such as disclosed in the aforementioned copending Clemens application (U.S. Patent application, Ser. No. 126,772). The surface of the turntable 2 is adapted to support a disc 3. A motor and a suitable engaging mechanism (not shown) drives the turntable 2 at a predetermined speed when the player is operative. The rotational motion of the turntable 2 is transmitted to the disc 3 via frictional contact between the turntable 2 and the disc 3. Video information is contained in geometric variations in the bottom of a smooth spiral groove 4 on the surface of the disc 3. The disc surface includes a layer of conductive material which is preferably covered with a thin coating of dielectric material. A stylus 5 subject to positioning in groove 4 includes a conductive surface which, together with the conductive material and dielectric coating of the disc, form a capacitor. When relative motion is established between the stylus 5 and the disc 3 an edge of the conductive surface included in the stylus 5, while riding in the groove 4, recovers capacitive variations due to the geometric variations in the bottom of the spiral groove. The capacitive variations which represent recorded video information are applied to suitable signal processing circuits and composite video signal obtained therefrom is then coupled to a conventional television receiver (not shown) for reproduction.

One end of a stylus arm 6 carries the stylus 5. The other end of the stylus arm 6 is permanently inserted into a stylus arm holder 7. The stylus arm holder 7 is flexibly coupled to a stylus arm carrying structure by a pivot coupling 31 (described later) incorporating the principles of the present invention.

The stylus arm carrying structure comprises a velocity adjusting system 8 mounted on a transverse feed drive mechanism. The transverse feed drive mechanism causes the velocity adjusting system 8 carrying the stylus arm assembly to traverse radially inward towards the center of rotation of the disc. The transverse motion of the stylus arm assembly provides approximate lateral tracking of the stylus 5 in the groove 4 in proper time relationship with the rotation of the disc. Any discrepancy in the lateral tracking is compensated by the lateral movement of the stylus arm 6 at the pivot coupling 31. In video disc systems, the fragile walls of relatively narrow grooves of the disc cannot be dependably relied upon to pull the stylus arm assembly around the pivot across the entire recorded surface of the disc. Also in video systems utilizing variable capacitor concept, it is desirable for accurate reproduction that the conductive surface included in the stylus 5 maintain substantially constant attitude toward the groove. The transverse feed drive mechanism satisfies the above requirements by traversing the pivoted end of the stylus arm 6 in proper time relationship with the stylus end engaged in the groove 4 so as to continuously maintain the longitudinal axis of the stylus arm substantially tangential to the groove at the point of engagement.

Illustratively, velocity adjusting system 8 may be of the type disclosed in U.S. Pat. No. 3,711,641, issued to R. C. Palmer on Jan. 16, 1973, entitled "Velocity Adjusting System." In the Palmer type system the cyclical speed errors in the relative speed between the disc 3 and the stylus 5 are compensated by varying the position of the stylus in relation to the disc. Circuit means provide an error signal representative of deviations of the instantaneous speed from the predetermined speed. Transducer means, responsive to the error signal, impart motion to the stylus arm pivot coupling 31 in a manner that minimizes the speed error.

A box-like shield enclosure 9 attached to the velocity adjusting system 8, houses the stylus arm assembly. In the operative position the stylus arm 6 protrudes through an aperture 10 in the bottom of the shield enclosure 9 permitting the stylus 5 to ride in the groove 4 on the disc 3. In the inoperative position a pivotally mounted stylus arm centering ramp 11 sustains the free end of the stylus arm 6. As the stylus arm 6 is lifted out of engagement by the centering ramp 11, which may be manually or automatically actuated, the V-shaped slot 12 provided in the centering ramp permits the stylus arm to gravitate to the center of the ramp. As the stylus arm 6 is lowered for playback, the V-shaped slot 12 causes the stylus 5 to descend substantially centrally for smooth engagement with the spiral groove 4 in a manner that minimizes the likelihood of misalignment.

It is noted that in the operative position the centering ramp 11 is out of contact with the stylus arm 6 to permit free pivotal movement of the stylus arm.

Figure 2:
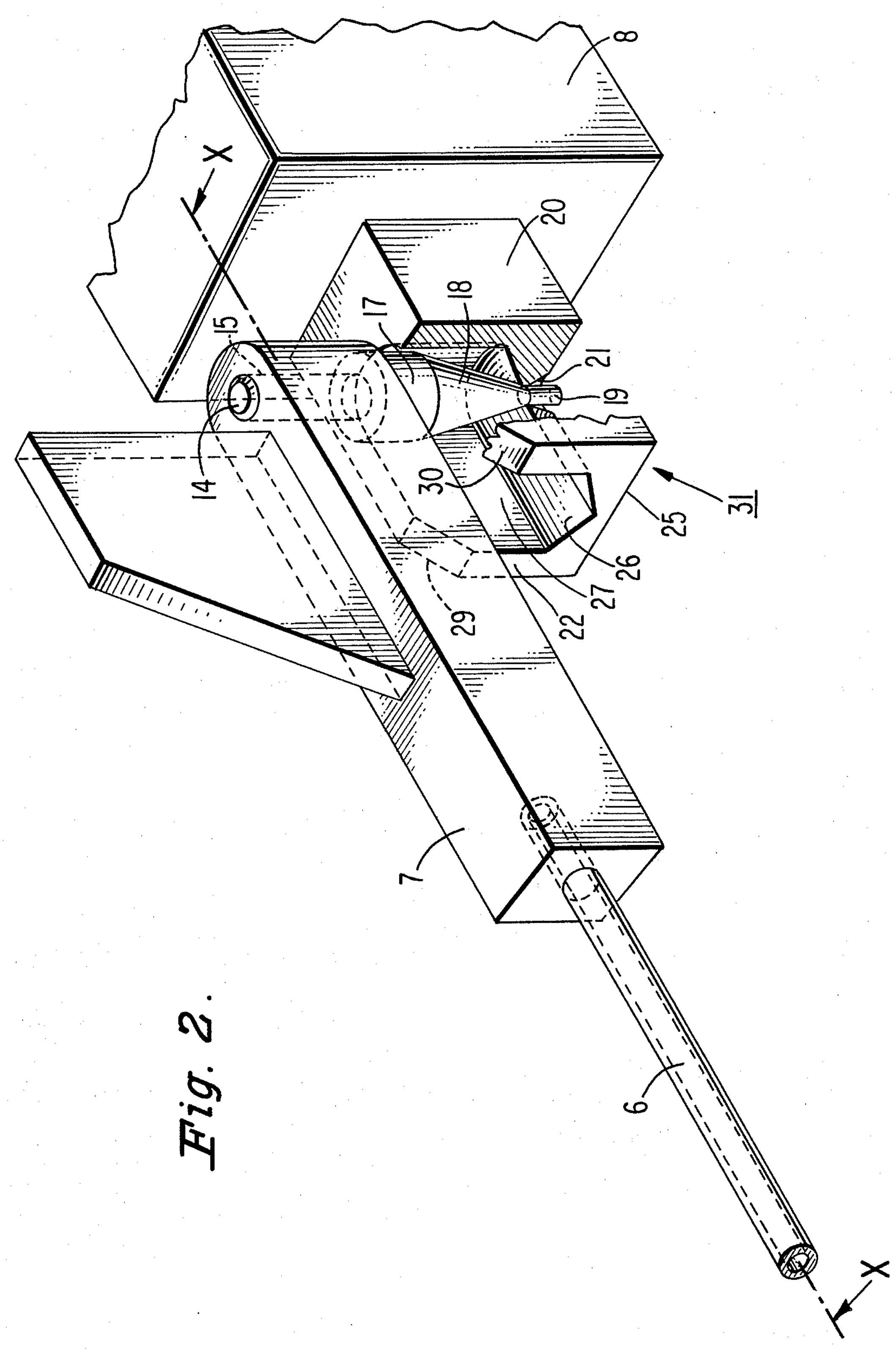
FIG. 2 is a perspective cut-away view of the stylus arm pivot coupling of FIG. 1.

As illustrated in FIG. 2, the stylus arm pivot coupling 31 comprises a pin 15 of a plug 13 inserted permanently in an aperture provided in the stylus arm holder 7. A conical segment 18 of the plug 13 makes a partial entry into an opening 21 disposed in a supporting member 20. The peripheral surfaces of the conical segment 18 are engaged by annular surfaces of the opening 21.

The supporting member 20 is attached to a movable member of a velocity adjusting system 8 mounted on the transverse feed drive mechanism.

Figure 3B:
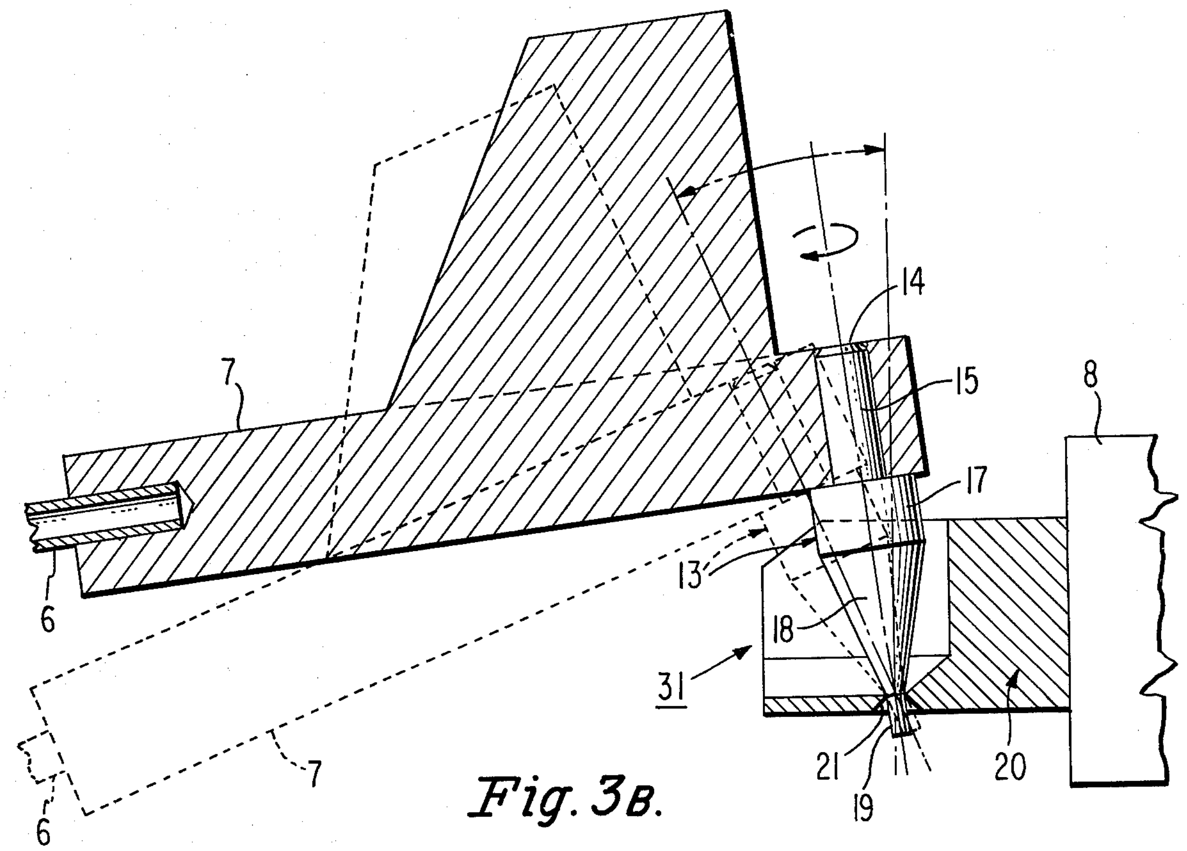
FIG. 3B is a sectional view of the stylus arm pivot coupling taken along line X—X of FIG. 2.
Figure 3A:
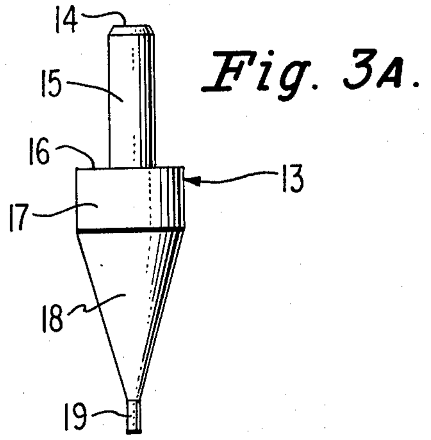
FIG. 3A illustrates a stylus arm pivot plug suitable for use with the stylus arm pivot coupling of FIGS. 1 and 2.

As illustrated in FIGS. 3A and 3B, the plug 13 comprises the pin 15, a shank portion 17, a conical segment 18 and a cylindrical tip 19. The chamfered end 14 of the pin 15 facilitates entry of the pin into the aperture provided in the arm holder 7. The pin 15 is press fitted into the aperture provided in the arm holder 7 in such a way as not to allow any relative motion between the plug 13 and the arm holder. A shoulder portion 16 of the shank 17 is in contact with the surface of the armholder 7 through which the pin 15 is inserted. The cylindrical tip 19 is passed through the opening 21 so as to allow the peripheral surfaces of the conical segment 18 to engage the annular surfaces of the opening. The function of the cylindrical tip 19 is to facilitate an easy drop in re-engagement of the plug 13 into proper operative position with the support member 20.

Figure 3C:
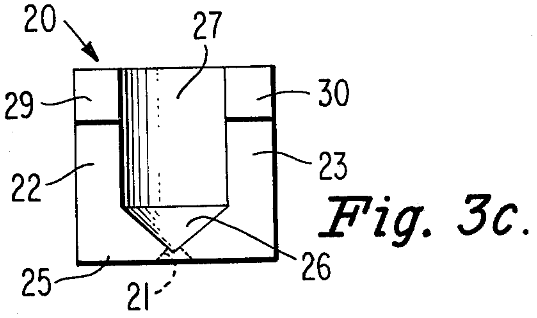
FIG. 3C illustrates an elevation of the stylus arm support member suitable for use with the stylus arm pivot coupling of FIGS. 1 and 2.
Figure 3D:
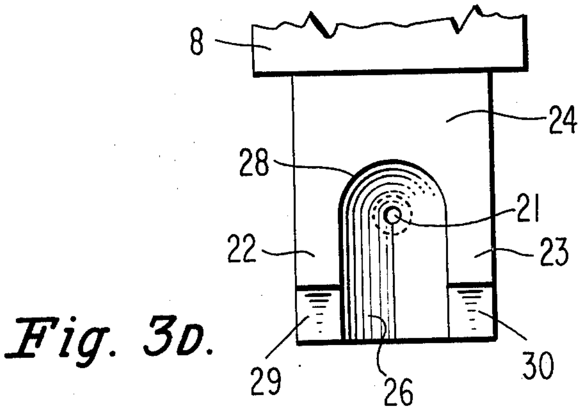
FIG. 3D illustrates a plan view of the stylus arm support member suitable for use with the stylus arm pivot coupling of FIGS. 1 and 2.

As illustrated in FIG. 3C and FIG. 3D, the generally C-shaped supporting member 20 attached to the movable member of the velocity adjusting system 8 has a circular opening 21 for receiving the conical segment 18 of the plug 13. The supporting member 20 comprises two parallel side walls 22 and 23, a backwall 24 and a lower wall 25. The lower wall 25 has a 90° V-shaped groove 26 running parallel to the side walls 22 and 23. The apex of the V-shaped groove 26 is pointed toward the disc 3. The side walls 22 and 23 are spaced at a distance slightly greater (e.g., 0.001 inch) than the diameter of the shank 17 with which they are in sliding engagement. It is noted that the parallel side walls 22 and 23 allow lateral motion of the stylus arm 6 by not obstructing the rotational movement of the plug 13 in the opening 21. Also the parallel walls 22 and 23 do not inhibit the vertical motion of the stylus arm toward and away from the disc surface as the shank 17 is allowed to rock in the slot 27 formed by the parallel walls. But the parallel walls 22 and 23 will prohibit tipping motion of the plug 13 in a direction perpendicular to the slot 27. In other words, the stylus arm 6 will not be allowed to rotate around an imaginary axis formed by a straight line joining the stylus tip 5 and the center of the opening 21. This antirotational provision enables the conductive surface included in the stylus 5 to maintain substantially constant attitude in the groove, which is desirable for accurate reproduction of the recorded signal. The backwall 27 has a semicircular channel 28 parallel to the side walls 22 and 23. The channel 28 converges into the center of the opening 21 forming a funnel subtending a 90° angle at the apex. It is noted that the inside surfaces of the two parallel side walls 22, 23, the semicircular channel 28 in the backwall 24, and the V-shaped groove 26 in the lower wall 25, cooperate to form one continuous cavity encircling the plug 13. The funnel and the V-shaped groove 26 smoothly lead the cylindrical tip 19 into the opening 21 for substantially instantaneous drop in re-engagement of the plug 13 into proper position with the support member 20. The side walls 22 and 23 are chamfered at 29 and 30 to allow unobstructed lateral motion of the stylus arm 6.

The weight distribution and the geometry of the stylus arm assembly is such that in operative position the line joining the center of gravity of the stylus arm assembly and the pivotal center, i.e., the center of the aperture 21, is substantially parallel to the direction of motion imparted to the stylus arm assembly by the velocity adjusting system 8. This feature prevents the plug 13 attached to the stylus arm from being jerked out of the support member 20 which may cause damage to the disc and the stylus.

As indicated, for satisfactory operation of the velocity adjusting system 8 the motion imparted to the support member 20 of the stylus arm pivot must be transmitted to the stylus 5 at error frequencies. As shown in the FIG. 3B, the motion is transmitted by the velocity adjusting system 8 to the support member 20. The annular surfaces of the opening 21 in the support member 20 continuously engage the periphery of the plug 13 and hence the motion is imparted to the plug. The motion of the plug is transmitted to the stylus 5 via the stylus arm holder 7 and the stylus arm 6.

The self-adjusting feature of the stylus arm pivot coupling is by virtue of the fact that as the mating pivotal surfaces wear out, the conical segment 18 of the plug 13 automatically sinks further into the opening 21 and consumes the slack. Thus it will be seen that after initial setting of the stylus arm assembly in proper operative position no subsequent readjustments are necessary.

The stylus arm pivot coupling provides an arrangement which is compliant in the two directions perpendicular to the stylus arm and stiff along the longitudinal axis of the stylus arm. The low mass stylus arm assembly is sensitive to the imperfections in the disc surface such as warps and eccentricities. As the pivot offers a low torsional resistance, the tendency of the stylus arm assembly to skip and skate is reduced. The mechanism is self-adjusting and its simple construction is compatible with low cost mass production techniques.

What is claimed is:

1. In a playback system including a board, a turntable mounted for rotation relative to said board, said turntable having a surface adapted to receive a disc having a spiral groove with information recorded therein, a stylus subject to positioning in said spiral groove for detecting said information, a stylus arm carrying said stylus, and a stylus arm carrying structure linked to said board, a stylus arm pivot coupling, comprising:

a plug having a longitudinal axis, said plug having one end secured to said stylus arm, and having a region remote from said one end with a monotonously decreasing and substantially circular cross section;

a support member secured to said stylus arm carrying structure and having an opening in which said plug is seated when said stylus arm pivot coupling is in an assembled condition; said opening having dimensions permitting only a partial entry of said plug, and presenting annular surfaces for smooth engagement with a surface of said plug in said region when said coupling is in said assembled condition; and wherein said engagement of said surfaces of said support member opening and said plug permits (1) a rocking movement of said longitudinal axis of said plug toward and away from said turntable to accommodate vertical motion of said stylus during playback, and (2) rotation of said plug in said support member opening, about an axis substantially perpendicular to said turntable surface, to accommodate lateral motion of said stylus during playback.

2. A system as defined in claim 1 wherein the surface of said plug in said region comprises a section of a cone.

3. A system as defined in claim 1 wherein the surface of said plug in said region comprises a section of a sphere.

4. A system as defined in claim 1 wherein said support member opening has a circular periphery.

5. A system as defined in claim 1 wherein said support member opening has a circular periphery and the annular surfaces presented thereby for said engagement are flared.

6. A system as defined in claim 1 wherein said stylus arm carrying structure includes transducer means subject to translatory motion for varying the position of said stylus with respect to said disc in a direction tangential to said groove at the point of engagement so as to maintain substantially constant relative speed between said stylus and said disc, with said motion of said transducer means being transmitted to said stylus via said engaging surfaces of said support member opening and said plug.

7. A system as defined in claim 1 wherein said support member includes means for preventing rotation of said stylus arm around an imaginary axis, formed by a straight line joining the center of said opening in said member and the point where said stylus engages said spiral groove, said rotation preventing means comprising two parallel surfaces disposed to be substantially parallel to said axis of rotation, separated by a distance slightly greater than the maximum width dimension of said plug, and subject to sliding engagement with said plug during playback.

8. A system as defined in claim 1 wherein said plug is made of steel, and said support member having said opening for receiving said plug is made of material such as polystyrene having a low mutual coefficient of friction.

9. In a playback system including a board, a turntable mounted for rotation relative to said board, said turntable having a surface adapted to receive a disc having a spiral groove with information recorded therein, a stylus subject to positioning in said spiral groove for detecting said recorded information, a stylus arm carrying said stylus, and a stylus arm carrying structure linked to said board, a stylus arm pivot coupling, comprising:

a plug having a longitudinal axis, said plug having one end thereof secured to said stylus arm, said plug having a tapered portion with circular cross section in a region remote from said one end;

a support member with a circular opening having dimensions permitting only a partial entry of said plug, said opening presenting annular surfaces for smooth engagement with a surface of said tapered portion of said plug;

wherein said support member is attached to said stylus arm carrying structure; and wherein said engagement of said surfaces of said support member opening and said tapered portion of said plug permits (1) a rocking movement of said longitudinal axis of said plug toward and away from said turntable to accommodate vertical motion of said stylus during playback, and (2) rotation of said plug in said support member opening about an axis substantially perpendicular to said turntable surface to accommodate lateral motion of said stylus during playback.

10. Apparatus in accordance with claim 1 wherein the orientations of said support member opening, and said plug seated therein, are such, in said assembled condition of said stylus pivot coupling, that movement of said plug away from said turntable along said axis of rotation is permitted; such plug movement in said axial direction serving to effect, when desired, unseating of said plug and disassembly of said stylus pivot coupling in a manner achieving separation of said stylus arm from said stylus arm carrying structure.

* * * * *